United States Patent
Milenkovic

(10) Patent No.: US 9,260,147 B2
(45) Date of Patent: Feb. 16, 2016

(54) DYNAMIC PREDICTOR FOR ARTICULATED MECHANISMS

(71) Applicant: Wisconsin Alumni Research Foundation, Madison, WI (US)

(72) Inventor: Paul H. Milenkovic, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 310 days.

(21) Appl. No.: 13/927,788

(22) Filed: Jun. 26, 2013

(65) Prior Publication Data

US 2015/0005941 A1 Jan. 1, 2015

(51) Int. Cl.
| | | |
|---|---|---|
| *B25J 9/16* | (2006.01) | |
| *B62D 57/032* | (2006.01) | |
| *B25J 9/00* | (2006.01) | |
| *B62D 57/02* | (2006.01) | |

(52) U.S. Cl.
CPC ............... *B62D 57/032* (2013.01); *B25J 9/163* (2013.01); *Y10S 901/02* (2013.01)

(58) Field of Classification Search
CPC .......... B25J 9/0006; B25J 9/06; B25J 9/1602; B25J 9/1605; B25J 9/1607; B25J 9/163; B25J 9/1638; B25J 9/1653; B25J 9/1664; B25J 9/1671; B62D 57/00; B62D 57/02; B62D 57/022; B62D 57/024; B62D 57/028; B62D 57/032; G05D 2201/0217; G05B 2219/40244; G05B 2219/40264; G05B 2219/40305
See application file for complete search history.

(56) References Cited

U.S. PATENT DOCUMENTS

| | | | | |
|---|---|---|---|---|
| 2003/0120388 A1* | 6/2003 | Kuroki et al. | ............... | 700/245 |
| 2003/0139849 A1* | 7/2003 | Kuroki et al. | ............... | 700/245 |
| 2012/0303318 A1* | 11/2012 | Milenkovic | ............... | 702/150 |

OTHER PUBLICATIONS

Karsai, Geza, Method for the Calculation of the Combined Motion Time Derivatives of Optional Order and Solution for the Inverse Kinematic Problems, Mechanism and Machine Theory 36 (2001), pp. 261-272.

Ambike, Satyajit, et al., Geometric, Spatial Path Tracking Using Non-Redundant Manipulators Via Speed-Ratio Control, Proceedings of the ASME 2010 International Design Engineering Technical Conferences & Computers and Information in Engineering Conference, Aug. 15-18, 2010, Montreal, Quebec, Canada.

Milenkovic, Paul, Series Solution for Finite Displacement of Planar Four-Bar Linkages, Journal of Mechanisms and Robotics, vol. 3, pp. 014501-1-014501-7, Feb. 2011.

\* cited by examiner

*Primary Examiner* — Khoi Tran
*Assistant Examiner* — Dale Moyer
(74) *Attorney, Agent, or Firm* — Boyle Fredrickson, S.C.

(57) ABSTRACT

A dynamic predictor usable for rapid and accurate calculation of joint commands of an articulated dynamical mechanism describes the relationship between the joints in the form of a differential equation. The predictor solves this differential equation for predicted joint states by fitting a polynomial equation having free parameters describing the predicted joint states to the differential equations by minimizing the differential equation residuals. This minimization employs a series expansion allowing algorithmic differentiation.

16 Claims, 2 Drawing Sheets

DYNAMIC PREDICTOR FOR ARTICULATED MECHANISMS

STATEMENT REGARDING FEDERALLY SPONSORED RESEARCH OR DEVELOPMENT

Not Applicable

CROSS REFERENCE TO RELATED APPLICATION

Not Applicable

BACKGROUND OF THE INVENTION

The present invention relates to articulated mechanisms, such as but not limited to walking robots, and more particularly to a dynamic predictor for determining link positions along with displacements of multiple joints achieving those positions, being particularly useful when selected joints have relatively stiff springs such as bushings or other provisions for compliance in their attachment to adjoining links.

Articulated mechanisms such as walking robots or robot arms can be understood as a set of rigid links connected to each other by joints. The joints in these mechanisms may be associated with actuators such as motors to displace the joints directly or to apply forces effecting displacement of the joints, "passive" springs and dampers, along with sensors providing an indication of joint position. Common joints include so-called revolute joints acting like a hinge to provide rotation about an axis line and prismatic joints acting like a slide to provide translation along an axis direction. These types of joints are termed "lower-pairs". The absolute or global position of each link is determined by the sequence of connecting joints in the form of a kinematic chain where one joint is attached to and thus referenced to the "ground", which provides a global reference frame.

The effective control of such mechanisms is aided by an ability to mathematically predict the movement of the mechanism in response to commands sent to the various actuators. This prediction may be used to determine the necessary actuator positions to place one link at a particular location, to evaluate multiple control strategies, or to implement a control system employing a predictive model of a dynamic system within a feedback loop, in a feedforward or "open loop" controller, or other applicable control method. That dynamic system may be that of the physical robot or that of an augmented dynamic system formulated to effect known control algorithms.

The problem of determining the location of the link based on actuation of connecting joints (or the reverse), where that location is geometrically constrained by the joint displacements, is a kinematic problem and is discussed in detail in US patent application 2012/0303318 entitled "Kinematic Predictor For Articulated Mechanisms" assigned to the same assignee as the present application and hereby incorporated in its entirety by reference. That application describes a computerized predictor for rapidly determining control parameters for articulated mechanisms on an automatic basis with a high degree of precision.

Generally, the kinematic predictor employs a system of kinematic differential equations modeling the articulated mechanism and whose solutions describe motion of rigid links connected by joints and forming closed kinematic loops. A desired motion of the end link in a robot arm can be represented by a "virtual joint" forming such a closed loop. These equations are solved by direct substitution of the equation variables with multi-term power series expressions. Each closed kinematic loop establishes a linear relationship between power series coefficients of the same order which allows formation of a system of independent, linearly related equations, the latter solvable by well known automatic techniques. Accuracy approaching the limit of precision of the computer may thereby be obtained by extending the number of power series terms treated.

For "dynamical" mechanisms, that is, mechanisms not completely kinematically constrained and where inertial, spring, damping, gravitational, and applied forces play a significant role in their operation, the proper prediction of link location and associated joint displacements requires a model that includes parameters describing moments of inertia associated with links along with spring and damping constants associated with the joints. These additional parameters may be characterized by the differential equations of the model using generally understood techniques.

When the articulated mechanism has "stiff" springs, for example rubber bushings or other sources of compliance with high spring rates, solving the differential equations by term expansions can prove problematic. This is because the magnitude of higher-order expansion terms does not diminish rapidly, requiring treatment of "large" numbers of expansion terms in order to obtain the necessary accuracy, where large can denote a number impractical to compute in the required time or where the required accuracy cannot be achieved owing to limitations of the numerical representation provided by the computer.

SUMMARY OF THE INVENTION

The present invention provides a computerized dynamic predictor for determining control parameters for dynamical articulated mechanisms on an automatic basis with a high degree of precision. This dynamic predictor may be used for machine control or to model such mechanisms for design purposes.

Generally, the dynamic predictor performs an analysis of the motion of the system by evaluating solutions of the differential equation model in incremental time steps. The state variables of the differential equation constitute those quantities for which at a given moment in time, any other quantity in the system is related through an algebraic formula. Each time-step interval of the motion trajectory is approximated by a collection of polynomials, one polynomial for each state variable to express continuous variation in that variable over the duration of the time step. Each polynomial has "free parameter" coefficients relating to the constraints of the differential equation model to be applied at the endpoint of the step. These free parameters are not evaluated directly from the differential equation (for example, by series expansion about the start point of the step) but instead by a minimization of "the residuals". These residuals are derived from the difference between the derivative of a polynomial determined directly from its coefficients and the same quantity evaluated by substituting the collection of polynomials into the differential equation. Expanding the residuals using Taylor series, the residuals along with multiple orders of their derivatives are readily calculated from the Taylor series coefficients, anywhere on the time-step interval including the endpoint, and an algorithmic differentiation procedure determines the sensitivity of the Taylor coefficients to changes in the free parameters. This procedure allows the automatic adjustment of the polynomial free parameters to minimize the residuals and their derivatives at the time step endpoint. For conditions at the end of the time step to be controlled through adjustment of the free parameters is of special importance in obtaining a stable and accurate solution of a stiff dynamical system. In this way, improved polynomial approximations of the solution for the differential equation are obtained with the computation of a limited number of expansion terms.

More specifically, the present invention provides a dynamic predictor system using an electronic computer to store a system of differential equations describing a rate of change of joint state in each joint as a function of other joint states, the joint states describing: positions (meaning scalar displacements or deflections along an allowed movement) of the joints along with rate of change of those positions, such determining spring forces acting on the joints along with momentum in the connecting links. The dynamic predictor receives a first joint state and approximates a second later joint state using a collection of multi-term polynomials corresponding to the differential equations, the polynomials having first terms matching the first joint state and multiple later terms related to derivatives of a predicted joint trajectory from the first joint state evaluated at the second joint state. The multiple later terms are evaluated by minimizing residuals between the corresponding differential equations and multi-term polynomials by performing a series expansion of the residuals. An evaluation of the multi-term polynomials is used to output a prediction the second joint state.

It is thus a feature of at least one embodiment of the invention to provide a tractable method of predicting joint motion, particularly suitable for stiff dynamical systems, first by reserving "free parameters" of the polynomials associated with the second joint state, and second by evaluating the free parameters through a series expansion of residuals.

The polynomials may be Hermite polynomials.

It is thus a feature of at least one embodiment of the invention to avoid the typically poor convergence of the series expansion about the first joint state that can occur in stiff dynamical systems.

The minimization may minimize multiple derivative orders of the residuals.

It is thus a feature of at least one embodiment of the invention to provide a minimization that has fidelity to multiple orders of the polynomial.

Minimizing the multiple derivative orders of the residuals may be done by performing a series expansion of the residuals.

It is thus a feature of at least one embodiment of the invention to provide a minimization process that allows efficient automatic fitting techniques to be employed.

The series expansion may be a Taylor series expansion.

It is thus a feature of at least one embodiment of the invention to employ the well-characterized Taylor series expansion in identifying minimal residuals.

The Taylor series expansion may be minimized by algorithmic differentiation.

It is thus a feature of at least one embodiment of the invention to provide for rapid determination of minimums susceptible to automatic execution on the electronic computer.

The algorithmic differentiation determines a Jacobian matrix.

It is thus a feature of at least one embodiment of the invention to employ a well-characterized method of minimizing the system of equations.

The dynamic predictor may further include a set of sensors for monitoring joint positions. In addition or alternatively, the dynamic predictor may include a set of actuators for movement of the joints.

It is thus a feature of at least one embodiment of the invention to provide for improved control of articulated mechanisms.

The electronic computer may further execute the step of receiving a command indicating a desired second joint state and providing feedforward to the actuators based on the predicted second joint state.

It is thus a feature of at least one embodiment of the invention to provide improved control of articulated mechanisms such as walking machines.

These particular objects and advantages may apply to only some embodiments falling within the claims and thus do not define the scope of the invention.

DETAILED DESCRIPTION OF THE PREFERRED EMBODIMENT

Figure 1:
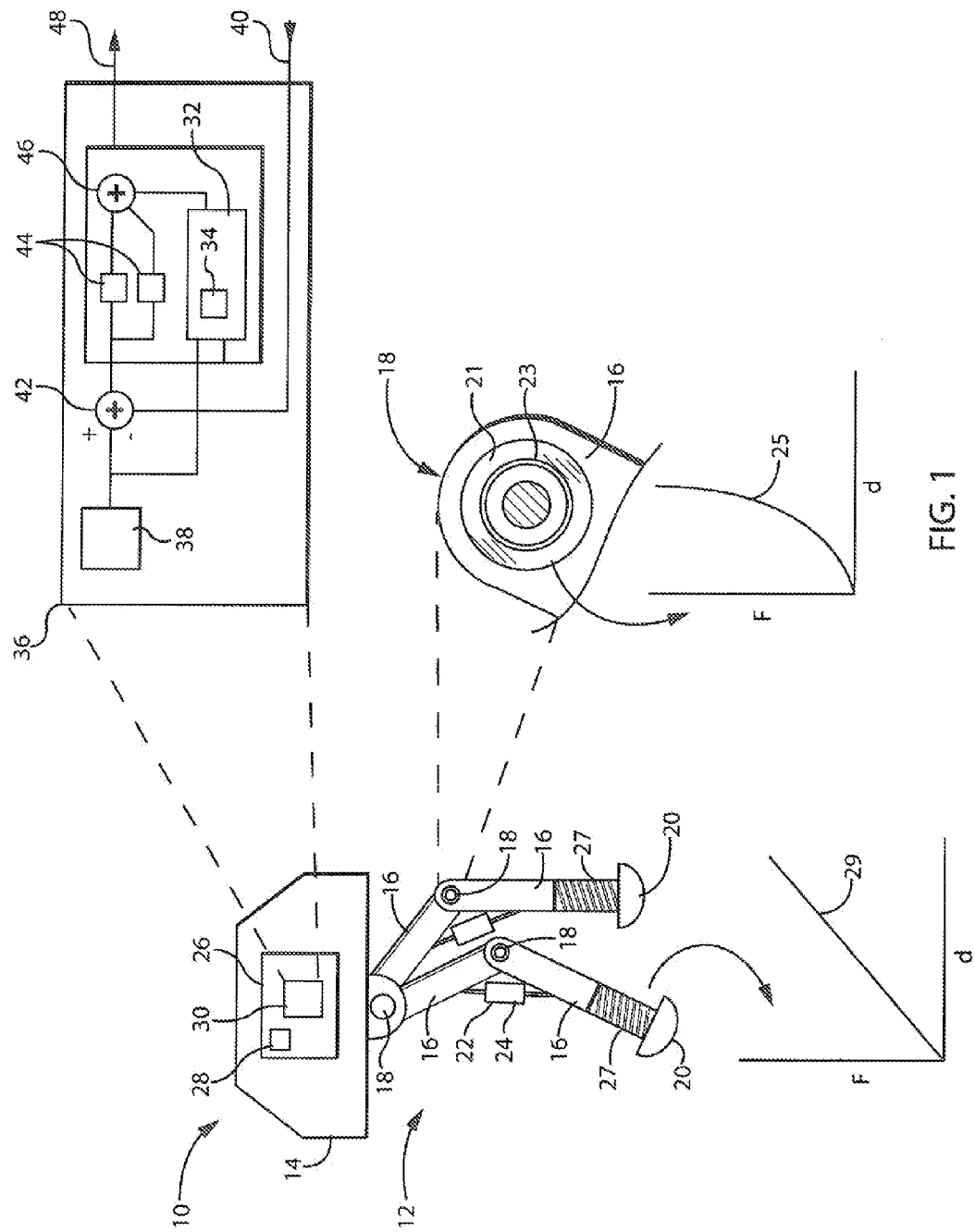
FIG. 1 is a simplified block diagram of an example walking machine having an articulated linkage of a type suitable for use with a dynamic predictor of the present invention, the walking machine having a controlling electronic computer for implementing a control loop shown in an expanded fragmentary view and providing joints that exhibit stiffness as depicted in an expanded fragmentary view and an associated graph of a stiff spring function as well as joints that exhibit un-stiff spring response as depicted in an associated graph of an un-stiff spring function.

Referring now to FIG. 1, an articulated controlled dynamical mechanism such as a walking machine 10 may include articulated legs 12 positioned to support a main machine body 14. Each of the articulated legs 12 may include links 16 being substantially rigid bars connected by joints 18. The legs 12 may have an end effector 20, for example, providing for ground-contacting feet or the like.

Each of the joints 18 provides for relative movement between the associated links 16 using mechanisms including but not limited to a slide or rotary coupling. Each of the joints 18 may communicate with an actuator 22, such as a hydraulic cylinder or motor for moving the joint 18, and a sensor 24, such as an encoder, linear variable transformer (LVT), tachometer, or the like (shown incorporated into the actuator 22), for reading out the position and velocity of the joint 18 when moved.

Electrical signals to the actuators 22 and from the sensors 24 may be communicated to an electronic computer 26. The electronic computer 26 may have a processor 28 communicating with a memory 30 such as random access memory, disk drive, or the like. The memory 30 may hold, among other programs such as an operating system, a dynamic predictor program 32 as will be described below. The memory 30 may further hold a model 34 of the articulated links 16 expressed in the form of one or more differential equations.

In particular, the walking machine legs 12 may include stiff springs, for example a rubber bushing 21, surrounding a rotary bearing 23 forming the joints 18 of the leg 12. Generally the rubber bushing 21 will exhibit a stiff spring response 25 characterized by a rapidly rising force with distance function associated with compression of material such as elastomeric rubber or the like in normal operation of the walking machine 10. In addition, the walking machine legs 12 may include un-stiff springs, for example a helical compression spring 27, providing for flexible extension of the end effector 20. Generally such a helical compression springs will exhibit un-stiff spring response 29 providing a substantially linearly changing force with a distance function over the anticipated operation of the machine 10. In contrast to the un-stiff spring response 29, the stiff spring response 25 can present problems in evaluating models of the operation of the legs 12.

In one embodiment, the dynamic predictor program 32 may be incorporated into a feedback loop 36, for example, receiving and processing control commands 38 such as those instructing the walking machine 10 as to desired movement of its legs 12. In one example, sensor data 40 may be received from the sensors 24 and provided to a summing junction 42 determining an error between the desired leg movement and the indications of the sensors 24. This error is provided to a set of control paths providing, for example, weighting of different functions of the error signal by weighting blocks 44 (for example, providing a weighting that is proportional to, a derivative of, integral, or a non-linear function of the error) which are then summed by summing junction 46 to provide output signals 48 to the actuators 22.

The dynamic predictor program 32 of the present invention, for example, may receive the sensor data 40 and the control commands 38 and provide a predicted position of the legs 12 that may be used in the control process, for example, for model predictive control providing additional control modifications to the summing junction 46. This diagram is intended to be representative of a variety of possible control strategies according to well-known techniques that may make use of predicted machine movement.

Figure 2:
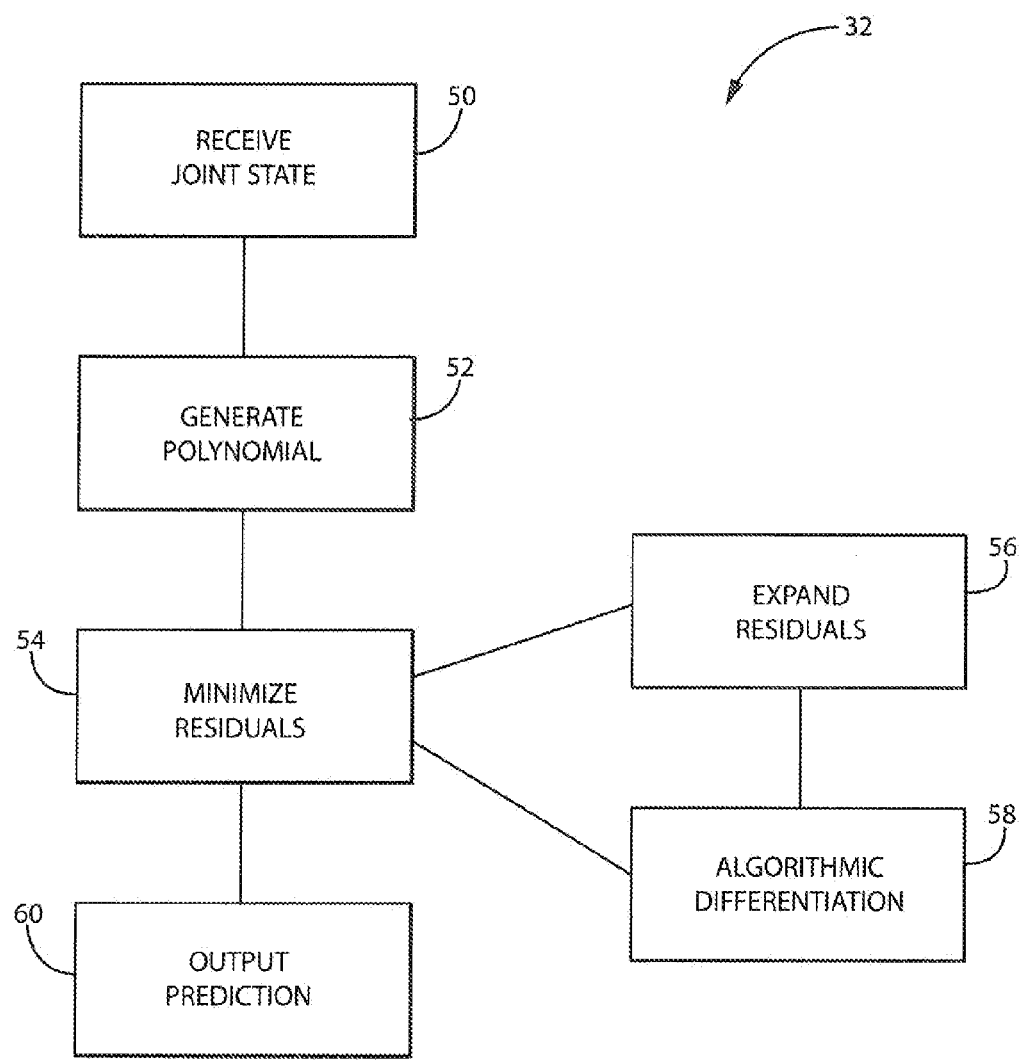
FIG. 2 is a flowchart showing the principal steps of the present invention as executed on an electronic computer.

Referring now to FIG. 2, the present invention will generally operate to receive a current joint state as indicated by process block 50 fully describing the position of the joint, its current velocity, and the deformation distances of any associated stiff and/or un-stiff springs.

At process block 52, a polynomial is generated that anticipates changes in the joint state for each joint state variable for an increment in time into the future. This polynomial must be fit to a known model of the mechanism held in the differential equations expressing the model 34 describing the machine 10. As will be discussed below, the polynomial term generally describes an expansion whose elements are associated with different derivatives of the polynomial such as may be conformed to the differential equations of the model 34. Some of these terms will be associated with the current joint state but some of these terms will be held as "free parameters" to be functions of the final joint state being predicted.

As indicated by process block 54, these free parameters are evaluated by minimizing residuals determined from the differences between corresponding derivative orders of the polynomial predicted value compared to the values provided by the differential equation model 34.

In one embodiment, these residuals are minimized by expanding the residuals as indicated by process block 56 using a Taylor series expansion and applying an algorithmic differentiation to the expansions as indicated by process block 58 providing a Jacobian matrix that may be used to minimize the residuals.

Once the minimization is completed, as indicated by process block 68, predicted output being predicted values of the joint state for the later time may be provided.

A more detailed overview and comprehensive view will now be provided.

OVERVIEW

Hermite-Taylor Multi-Derivative Method

A dynamical system is represented by the ordinary differential equations (ODEs)

$$\dot{Y}(t) = F(t, Y(t)) \tag{1}$$

where vector Y(t) constitutes the collection of state variables of the system sampled at time t, and $\dot{Y}(t)$ is the derivative of that system state with respect to time. A numerical approximation to the solution on the time interval $0 \le t \le h$ is expressed with the collection of Hermite polynomials represented in vector form as $$Y_H(t) = Y[0] + Y[1]t + \ldots + Y[p+q]t^{p+q} \tag{2}$$

That polynomial along with p derivatives is chosen to match the function and p derivatives $Y_0^{(k)}$ of state vector Y(t) at t=0 according to $$Y[k] = \frac{1}{k!} Y^{(k)}(0), \, 0 \le k \le p$$

where the q polynomial coefficients Y[k] for $p+1 \le k \le p+q$ are free parameters. A Hermite polynomial is a "term of art" for a polynomial matching a function and its derivatives at the start and end of a time interval, but the following method by which Eq. (2) expresses the Hermite polynomial is novel.

For $Y(t) = Y_H(t)$, an "algorithmic differentiation" method specific to the type of dynamical system—electrical, mechanical, chemical, molecular geometry—expands the differential equation residual $$E(t) = \dot{Y}(t) - F(t, Y(t)) \tag{3}$$

in a Taylor series in order to evaluate E(h) along with derivatives $E^{(1)}(h), \ldots, E^{(q-1)}(h)$. Also using algorithmic differentiation to determine the Jacobian matrix, a term of art for the variation in the values of $E(h), E^{(1)}(h), \ldots, E^{(q-1)}(h)$ with change in the free parameters, adjust the q vector parameters $Y[p+1], \ldots, Y[p+q]$ to satisfy $$E(h) = 0 \; E^{(1)}(h) = 0 \ldots E^{(q-1)}(h) = 0 \tag{4}$$

Hermite-Taylor Multi-Integral Method

Vector W(t) is the p-th integral of Y(t) where Y(t) is the p-th derivative $Y(t) = W^{(p)}(t)$. For W(t) having the p,q Hermite polynomial of the form of Eq. (2), differential equation solution Y(t) has the approximation $$Y_H(t) = W_H^{(p)}(t) = Y[0] + Y[1]t + \ldots + Y[q]t^q \tag{5}$$

where the q polynomial coefficients $Y[k] 1 \le k \le q$ are the free parameters. For $Y(t) = Y_H(t)$, expand Eq. (3) in a Taylor series, and adjust the q vector parameters $Y[1], \ldots, Y[q]$ to satisfy $$E_W(h) = 0 \; E_W^{(1)}(h) = 0 \ldots E_W^{(q-1)}(h) = 0,$$

$$E_W(t) = E^{(-p)}(t), E(t) = \dot{Y}_H(t) - F(t, Y_H(t)) \tag{6}$$

The minus superscript (-p) denotes the p-th integral having the constants of integration in the anti-derivatives of the Taylor series expansion set to zero. "The residuals", elements of the vector $E_W(t)$, are now the p-th integration of the "the difference between the derivative of a polynomial determined directly from its coefficients and the same quantity evaluated by substituting the collection of polynomials into the differential equation". Such constitutes a p-integral method applied to the p, q Hermite polynomial representation of the differential equation solution. One can express solution procedures based on the O-integral method, same as the multi-derivative method, ranging up to the p-integral method.

Integral-Derivative State-Variable Pairs

Many dynamical systems, and especially mechanical systems with mass and spring elements as well as electrical systems with inductor and capacitor elements, have state variables occurring in integral-derivative pairings. These pairings are the positions and velocities in a mechanical system, the voltages and currents in an electrical system.

Upon separating the state variables into the pairing of vectors $Y(t)$ and $V(t)$ obeying the relationship $\dot{Y}(t)=V(t)$ and expressing each vector with the polynomial $$Y_H(t)=Y[0]+Y[1]t+\ldots+Y[q]t^q,$$

$$V_H(t)=V[0]+V[1]t+\ldots+V[q]t^q \quad (7)$$

where in the multi-integral method coefficients $V[1], \ldots, V[p]$ constitute the free parameters for $V_H(t)$, the free parameters $Y[1], \ldots, Y[p]$ for $Y_H(t)$ are calculated from the coefficients of $V_H(t)$ by an explicit and algebraic formula. This calculation reduces by half the number of free parameters that need to be varied in minimizing the differential equation residuals at the end of the time step.

This procedure is applicable to both the multi-derivative and multi-integral methods. Defining $Y_D(t)=\dot{Y}_H(t)$, coefficients $$Y_D[k] = V[k] - \gamma_{k,g}C_{q,k-p+g}V[p-g+q](-h)^{p-g+q-k}, \quad (8)$$

$$\gamma_{k,0}=1,\ \gamma_{k,1}=\frac{k+1}{p+q},\ \gamma_{k,g\geq 2}=\frac{(k+g)\ldots(k+1)}{(p+q)\ldots(p+q+1-g)}$$

where p, q is the order of the method, $0 \leq g \leq p$ gives the number of integrations, and $p-g \leq k \leq p-g+q-1$.

In this formulation of the numerical method, $Y_D(t) \neq V_H(t)$: the derivative of position hence differs slightly from the velocity, the two quantities becoming equal in the limit of high method order. In a multibody mechanical system where the other variables are calculated using the kinematic predictor method, position variables are integrated from $Y_D(t)$ whereas acceleration variables are differentiated from $V(t)$. Such a double set of "velocity" variables has precedent in the C. W. Gear linear multi-step method for the same reason of reconciling conflicting conditions; these conditions relate to the type of numerical approximation in the numerical method to the true solution.

Features of the Two Methods

Under conditions where the exact solution to the differential equation is $$Y(t)=e^{\lambda_i t}Y(0) \quad (9)$$

($\lambda_i$ is the i-th complex-valued eigenvalue of the linearized differential equation $\dot{Y}(t)=AY(t)$), both the multi-derivative and multi-integral methods compute the approximation $$Y(h)=R_{p,q}(\lambda_i h)Y(0) \quad (10)$$

where $R_{p,q}(\lambda_i h)$ is the p, q Padé rational approximant (the ratio of two polynomials) to $e^{\lambda_i h}$. For positive integer p, setting $q=p+1$ or $q=p+2$ gives both the desired A-stable and L-stable properties. This means that the numerical method is a good candidate for solving stiff differential equations arising in electrical, mechanical, chemical, and molecular geometry problems. Stiff problems have notoriously unstable solutions using explicit methods that simply extrapolate forward from the initial state without adjusting for conditions at the end of each solution step.

The multi-derivative method not only satisfies Eq. (10) for the state vector $Y(t)$, it also satisfies that equation for the first p derivatives $Y^{(1)}(t), \ldots, Y^{(p)}(t)$. This property may not be so desirable as those derivatives need to be computed to form the Hermite polynomial $Y_H(t)$. On highly stiff problems, those derivative values can become very large in magnitude in proportion to powers of the stiff eigenvalue $\lambda_i$. Those large values "use up" the precision of the floating point representation in a digital computer, resulting in inaccurate or even unstable solutions as a consequence of performing arithmetic on numbers that differ widely in scale. The p-integral method only satisfies Eq. (10) for the state vector $Y(t)$ and no longer for derivatives of $Y(t)$. By giving up a solution with continuous derivatives, the multi-integral method avoids the difficulties of lost numerical accuracy and even instability associated with calculating the large-magnitude derivatives in stiff problems. If a continuous first derivative is required, p-1-integral method, for example, generates a solution that is continuous in $Y(t)$ and its first derivative, and so on.

One analogy to the benefit of the new multi-integral method is the analog computer, a hardware device using either mechanical or electrical devices to solve a dynamical system. Whereas the differential equation is typically written in terms of derivatives, analog computers always express the same problem with integrations; differentiations magnify small disturbances that would make the solution "noisy." The multi-derivative method is also like attempting to back up a farm tractor coupled to a hay wagon. The smallest error in steering is rapidly translated into that rig jack-knifing. The multi-integral method is like backing up an automobile—not a trivial problem, but something that everyone with a driver's license has been trained to do.

The proposed multi-derivative method is a new implementation of a known numerical method for ordinary differential equations. The new part is expanding residual E(t) in a Taylor series, resulting in simplification in solving Eq. (4) over the known "direct" method. The multi-integral method version of the multi-derivative method is also new.

DETAILED EXAMPLE

Summary

The Hermite-Obreshkov-Padé (HOP) procedure is an implicit method for the numerical solution of a system of ordinary differential equations (ODEs) applicable to stiff dynamical systems. This procedure applies an Obreshkov condition to multiple derivatives of the system state vector, both at the start and end of a time step in the numerical solution. That condition is shown to be satisfied by the Hermite interpolating polynomial that matches the state vector and its derivatives, also at the start and end of a time step. The Hermite polynomial, in turn, can be specified in terms of the system state and its derivatives at the start of a step together with a collection of free parameters. Adjusting these free parameters to minimize magnitudes of the ODE residual and its derivatives at the end of a step serves as a proxy for matching the system state and its derivatives. A high-order Taylor expansion at the start of a time step interval models the residual and its derivatives over the entire interval. A variant of this procedure adjusts those parameters to match integrals of the system state over the duration of that interval. This is done by minimizing magnitudes of integrals of the ODE residual calculated from the extrapolating Taylor series expansion, a process that avoids the need to determine integration constants for multiple integrals of the state. This alternative method eliminates the calculation of high-order derivatives of the system state and hence avoids loss in accuracy from floating-point round off.

1 Introduction

A stiff dynamical system is defined to have properties that work against obtaining a stable and accurate numerical solution. Generally speaking, an explicit numerical solver extrapolates conditions at the start of a solution time step to the end of that step and is susceptible to unstable overshoot unless vanishingly small steps are used; an implicit procedure can suppress that overshoot by taking into account conditions at the time step end.

An implicit solver calculates a Jacobian matrix for the sensitivity of conditions at the time step end with respect to a set of independent parameters. That solver also conducts multiple equation evaluations in the course of an iterative Newton-type minimization. This process can require multiples of the computer operations of an explicit solver of the same order and step size, but computation time and global error are reduced when the implicit solver allows larger and fewer time steps. Explicit solvers have been considered when there is separation between a set of rapidly damped stiff solution modes (the "fast" modes) and a set of slower modes: each composite time step incurs the computational overhead of a burst of small steps damping out the fast modes followed by a larger step to move forward in time with the remaining slower modes.

The HOP method requires calculating high-order derivatives of the system state, which is accomplished with an automatic or algorithmic differentiation procedure. On the multibody dynamics problem, that algorithmic differentiation procedure is specific to the problem domain of kinematics in 3D. This procedure for the accurate calculation of derivatives therefore makes the HOP method usable in practice.

This direct HOP method adjusts the state and its derivatives at the end of each time step to satisfy the ODEs and also meet the Obreshkov condition relating derivatives at the start and end of the step. The HOP method can be formulated to be A-stable and L-stable on linear problems although it can be unstable on highly non-linear problems. The HOP solver can also experience instability at high method orders that is attributed to numeric round off owing to the geometric growth in the higher derivatives occurring in stiff systems. Achieving high accuracy in the multibody dynamics problem also requires an initial burst of closely spaced time steps to damp out any fast modes present in the initial conditions.

The new HOP method uses an O(N) Taylor model of the system at the start of the time step to calculate variables that depend on the state variables over the entire time step interval. The Taylor expansion is denoted O(N) when position coefficients range from Y[0], ..., Y[N], velocity coefficients range up to V[N−1], and forces up to F[N−2]. The new HOP method represents the state variables with Hermite interpolating polynomials that match derivatives of the state at the start and end of the time step interval. All other system variables by definition have a pure algebraic dependence on the state variables, which is an implicit relationship in the differential algebraic equation (DAE) expression of a multibody dynamical system. The kinematic constraints are solved using the methods described in Milenkovic, P., 2012, "Series Solution for Finite Displacement of Single-Loop Spatial Linkages," ASME Journal of Mechanisms and Robotics, 4(2) p. 021016 (14 henceforth "Series Solution") hereby incorporated by reference. These dependent variables are expressed by O(N) Taylor series expansions about the time step start, generated in order-recursive manner from the polynomial coefficients of the state variables.

Upon satisfying the ODEs at the time step start, the Hermite polynomial coefficients are adjusted to direct the values of derivatives of the state variables, along with coefficients for all other system variables, to satisfy the ODEs at the time step end. The form of the Hermite polynomials also insures that the Obreshkov relationship between state derivatives at the time step start and end is satisfied automatically. This process requires calculation of a Jacobian along with iterative updates in a Newton-type algorithm.

A predictor step using a high-order Taylor series representation of a time-varying linearization of the ODEs has also been considered as part of an implicit method for stiff problems. Differing from this earlier application to a stiff problem, the proposed Taylor model is subject to the stabilizing adjustments made to the Hermite coefficients to meet implicit-solver conditions at the time step end.

Most importantly, the Taylor model allows integrating the system variables from their polynomial or truncated power series representations. This enables a multi-integral variant to the multi-derivative HOP method, one which avoids numerical problems associated with calculating high-order derivatives of the state variables. Numerical tests show such a procedure to be accurate with a greatly reduced number of initial burst steps. The Taylor model also allows for a mixed implicit-explicit (IMEX) procedure offering savings in computation time.

In what follows, Section 2 contributes 1) how the Hermite polynomial satisfies the Obreshkov relationship between state derivatives, 2) the multi-integral counterpart to the multi-derivative HOP solver, 3) the linear relationship between Hermite polynomial coefficients for position and velocity variables, and 4) the determination of the dependent-variable power series from pairings of Hermite polynomials for position and velocity state variables. Section 3 presents numerical results.

2 Methods

A system of ordinary differential equations (ODEs) is expressed $$\dot{Y}(t) = F(t, Y(t)) \qquad (11)$$

where vector Y(t) constitutes the state variables of the system sampled at time t, and $\dot{Y}(t)$ is the derivative of the system state with respect to time. Strictly speaking, such a system of ordinary differential equations is no more than an algebraic relationship between a state vector and its derivative for any chosen value of that state vector and for any designated time. That algebraic relationship admits a multiplicity of solution trajectories Y(t) as time t varies. The initial value problem (IVP) is one of determining the unique solution for times $t \geq t_0$, that starts with state $Y(t_0)$.

Applying the rules of differentiation to the function F determines higher derivatives of Y. Starting with sample values $Y_0 = \tilde{Y}(t_0)$ and $Y_h = \tilde{Y}(t_0 + h)$ of an approximation $\tilde{Y}(t)$ to a solution Y(t), Eq. (11) thus defines derivatives $Y_0^{(k)}$ and $Y_h^{(k)}$ for positive integers k. The true solution Y(t) satisfies Eq. (11) for all t whereas the approximation $\tilde{Y}(t)$ may satisfy Eq. (11) along with a limited number of derivatives of that relation only at specified sample points, which are no longer located along a trajectory Y(t); this distinction is germane to the formulation of a numerical solution procedure.

An Hermite-Obreshkov-Padé (HOP) procedure for the numerical solution of ODEs satisfies the multi-derivative Obreshkov relation $$\sum_{k=0}^{p} p_k h^k Y_0^{(k)} = \sum_{k=0}^{q} q_k h^k Y_h^{(k)} \qquad (12)$$

where $p_0, p_1, \ldots, p_p$ and $q_0, q_3, \ldots, q_p$ are coefficients of the p, q Padé rational approximant of the exponential function, and state derivatives $Y_0^{(k)}$ and $Y_h^{(k)}$ satisfy Eq. (11). To see the manner of approximation, consider the linear constant-coefficient differential equation $$\dot{Y}(t) = AY(t)$$

Applying the conditions $Y_0^{(k)} = A^k Y_0$ for $0 \le k \le p$ and $Y_h^{(k)} = A^k Y_h$ for $0 \le k \le q$, it follows that $$Y_h = \left( \sum_{k=0}^{q} q_k h^k A^k \right)^{-1} \left( \sum_{k=0}^{p} p_k h^k A^k \right) Y_0 \qquad (13)$$

calculates a unique value for $Y_h$, subject to the matrix term in the reciprocal being invertible. Selecting initial state $Y_0$ as an eigenvector of matrix A having the non-repeated eigenvalue $\lambda_i$, it follows that $Y_0^{(1)} = AY_0 = \lambda_i Y_0$, $Y_0^{(k)} = A^k Y_0 = \lambda_i^k Y_0$ and hence $$Y_h = \frac{\sum_{k=0}^{p} p_k h^k \lambda_i^k}{\sum_{k=0}^{q} q_k h^k \lambda_i^k} Y_0 = R_{p,q}(\lambda_i h) Y_0 \approx e^{\lambda_i h} Y_0 \qquad (14)$$

is an admissible solution to Eq. (12), which according to Eq. (13) is also a unique solution. When $Y_0$ is comprised of a mix of eigenvectors of A, superposition allows treating each eigenvector component independently. Subject to q=p+1 or q=p+2, that the HOP method is A-stable and L-stable for linear dynamical systems follows from properties of the Padé rational approximant $R_{p,q}(\lambda_i h)$.

From the preceding exposition, if $Y_0^{(k)} = A^k Y_0 = \lambda_i^k Y_0$ and $Y_h^{(k)} = A^k Y_0 = \lambda_i^k Y_h = \lambda_i^k R_{p,q}(\lambda_i h) Y_0$, it follows that $$Y_h^{(k)} = R_{p,q}(\lambda_i h) Y_0^{(k)} \approx e^{\lambda_i h} Y_0^{(k)} \qquad (15)$$

for $0 \le k \le \min(p,q) = p$ when the conditions for Eq. (13) are satisfied and p<q. Thus p derivatives of the state have the same solution-approximating relationship as the state itself. Applying the Obreshkov relation to the g-th integration of Y(t) to find a differential equation solution for Y(t) can avoid numerical sums of the geometrically growing derivatives $Y_0^{(k)}$. Each integration "uses up" a derivative of Y(t) for which Eq. (15) applies. At the maximum number of integrations g=p, the method no longer generates an approximate solution having continuous derivatives across solution time steps. In trade, the method avoids numerical difficulties associated with calculating high orders of derivatives, which is of special importance on stiff problems.

As polynomials are easily integrated, the Hermite interpolating polynomial is central to obtaining a multi-integral HOP procedure. The connection between the Hermite polynomial and the Obreshkov relation is known. That the Padé coefficients give a rational approximation to $e^x$ is also known from consideration of continued fractions. The following is novel in establishing a direct connection between coefficients of the Hermite polynomial and a rational approximation to $e^x$.

2.1 Hermite Interpolating Polynomial

A solution time step spans the interval $t_0 \le t \le t_0 + h$. For notational simplicity, the time origin is shifted to $t_0 = 0$. The solution to the ODEs is approximated on that interval with the polynomial $$Y_H(t) = Y[0] + Y[1]t + \ldots + Y[p+q]t^{p+q} \qquad (16)$$

The first p derivatives of polynomial $Y_H(t)$ are chosen to match the first p derivatives $Y_0^{(k)}$ of state vector Y at t=0

$$Y[k] = \frac{1}{k!} Y_0^{(k)}, 0 \le k \le p \qquad (17)$$

Throughout this description, square brackets denote polynomial or power series coefficients whereas the round-bracket superscript denotes derivatives, either of a polynomial approximation or the underlying solution.

The q polynomial coefficients Y[k] for $p+1 \le k \le p+q$ are free parameters to be adjusted to make the first q derivatives of $Y_H(t)$ match the first q derivatives $Y_h^{(k)}$ of state vector $Y_h$ at the end of a time step. This match may be formulated in the instance of p=3 and q=4 with the matrix expression $$\begin{bmatrix} Y_h^{(0)} \\ Y_h^{(1)} \\ Y_h^{(2)} \\ Y_h^{(3)} \\ Y_h^{(4)} \end{bmatrix} = \begin{bmatrix} 1 & h & \frac{h^2}{2!} & \frac{h^3}{3!} & \frac{h^4}{4!} & \frac{h^5}{5!} & \frac{h^6}{6!} & \frac{h^7}{7!} \\ 0 & 1 & h & \frac{h^2}{2!} & \frac{h^3}{3!} & \frac{h^4}{4!} & \frac{h^5}{5!} & \frac{h^6}{6!} \\ 0 & 0 & 1 & h & \frac{h^2}{2!} & \frac{h^3}{3!} & \frac{h^4}{4!} & \frac{h^5}{5!} \\ 0 & 0 & 0 & 1 & h & \frac{h^2}{2!} & \frac{h^3}{3!} & \frac{h^4}{4!} \\ 0 & 0 & 0 & 0 & 1 & h & \frac{h^2}{2!} & \frac{h^3}{3!} \end{bmatrix} \begin{bmatrix} 0!Y[0] \\ 1!Y[1] \\ 2!Y[2] \\ 3!Y[3] \\ 4!Y[4] \\ 5!Y[5] \\ 6!Y[6] \\ 7!Y[7] \end{bmatrix}$$

$$= X^{-1} \begin{bmatrix} 1 & 1 & \frac{1}{2!} & \frac{1}{3!} & \frac{1}{4!} & \frac{1}{5!} & \frac{1}{6!} & \frac{1}{7!} \\ 0 & 1 & 1 & \frac{1}{2!} & \frac{1}{3!} & \frac{1}{4!} & \frac{1}{5!} & \frac{1}{6!} \\ 0 & 0 & 1 & 1 & \frac{1}{2!} & \frac{1}{3!} & \frac{1}{4!} & \frac{1}{5!} \\ 0 & 0 & 0 & 1 & 1 & \frac{1}{2!} & \frac{1}{3!} & \frac{1}{4!} \\ 0 & 0 & 0 & 0 & 1 & 1 & \frac{1}{2!} & \frac{1}{3!} \end{bmatrix} X \begin{bmatrix} Y_0^{(0)} \\ Y_0^{(1)} \\ Y_0^{(2)} \\ Y_0^{(3)} \\ 4!Y[4] \\ 5!Y[5] \\ 6!Y[6] \\ 7!Y[7] \end{bmatrix} \qquad (18)$$

In Eq. (18), X (Greek Chi) is an 8×8 diagonal matrix with elements $X_{i,j} = h^{i-1}$ whereas $X^{-1}$ is a 5×5 diagonal matrix with elements $X_{i,j}^{-1} = h^{1-i}$; in this and related formulas, the dimensions of matrices X and $X^{-1}$ are adjusted as needed to match the coefficient matrix being multiplied. Multiplying the coefficient matrix on the right by X has the effect of multiplying successive columns by powers of h; multiplying on the left by $X^{-1}$ multiplies successive rows by powers of $h^{-1}$, in this manner giving the correct power of h multiplying each non-zero element in the coefficient matrix.

Theorem: The polynomial $Y_H(t)$ of Eq. (16) satisfies the Obreshkov relation in Eq. (12).

Proof: The proof is illustrated with p=3 and q=4 and then generalized to all positive integers p and q. The p, q Padé rational approximant of ec is represented as $$R_{3,4}(x) = \frac{P(x)}{Q(x)} = \frac{1 + p_1 x + p_2 x^2 + p_3 x^3}{1 + q_1 x + q_2 x^2 + q_3 x^3 + q_4 x^4} \quad (19)$$

$$= 1 + x + \frac{1}{2!}x^2 + \frac{1}{3!}x^3 + \frac{1}{4!}x^4 + \frac{1}{5!}x^5 + \frac{1}{6!}x^6 + \frac{1}{7!}x^7 + O(x^8)$$

where the last line contains Taylor series terms of $e^x$ to the maximum order that can be represented by the rational expression. Clearing the denominator by multiplying Eq. (19) by $Q(x)$ and equating successive powers of x, the four coefficients $q_k$ satisfy the four linear relations $$0 = \frac{1}{4!} + \frac{1}{3!}q_1 + \frac{1}{2!}q_2 + q_3 + q_4$$

$$0 = \frac{1}{5!} + \frac{1}{4!}q_1 + \frac{1}{3!}q_2 + \frac{1}{2!}q_3 + q_4$$

$$0 = \frac{1}{6!} + \frac{1}{5!}q_1 + \frac{1}{4!}q_2 + \frac{1}{3!}q_3 + \frac{1}{2!}q_4$$

$$0 = \frac{1}{7!} + \frac{1}{6!}q_1 + \frac{1}{5!}q_2 + \frac{1}{4!}q_3 + \frac{1}{3!}q_4$$

The preceding generalizes to q coefficients $q_k$ satisfying the q linear equations $$0 = \frac{1}{(p+k)!} + \frac{1}{(p+k-1)!}q_1 + \ldots + \frac{1}{(p+k-j)!}q_j \quad (20)$$

for $1 \leq k \leq q$ and each series terminating with $j=q$ or $p+k-j=0$.

Given the solution for coefficients $q_k$, coefficients $p_k$ are determined by the three relations $$p_1 = 1 + q_1,$$

$$p_2 = \frac{1}{2!} + q_1 + q_2,$$

$$p_3 = \frac{1}{3!} + \frac{1}{2!}q_1 + q_2 + q_3$$

In the general case, there are also p coefficients $p_k$ satisfying the p linear equations $$p_k = \frac{1}{k!} + \frac{1}{(k-1)!}q_1 + \ldots + \frac{1}{(k-j)!}q_j \quad (21)$$

for $1 \leq k \leq p$ and each series terminating with $j=q$ or $k-j=0$.

The Obreshkov relation from Eq. (12) has the matrix form $$[1 \quad p_1 \quad p_2 \quad p_3] X \begin{bmatrix} Y_0^{(0)} \\ Y_0^{(1)} \\ Y_0^{(2)} \\ Y_0^{(3)} \end{bmatrix} = [1 \quad q_1 \quad q_2 \quad q_3 \quad q_4] X \begin{bmatrix} Y_h^{(0)} \\ Y_h^{(1)} \\ Y_h^{(2)} \\ Y_h^{(3)} \\ Y_h^{(4)} \end{bmatrix} = [1 \quad q_1 \quad q_2 \quad q_3 \quad q_4]$$

$$XX^{-1} \begin{bmatrix} 1 & 1 & \frac{1}{2!} & \frac{1}{3!} & \frac{1}{4!} & \frac{1}{5!} & \frac{1}{6!} & \frac{1}{7!} \\ 0 & 1 & 1 & \frac{1}{2!} & \frac{1}{3!} & \frac{1}{4!} & \frac{1}{5!} & \frac{1}{6!} \\ 0 & 0 & 1 & 1 & \frac{1}{2!} & \frac{1}{3!} & \frac{1}{4!} & \frac{1}{5!} \\ 0 & 0 & 0 & 1 & 1 & \frac{1}{2!} & \frac{1}{3!} & \frac{1}{4!} \\ 0 & 0 & 0 & 0 & 1 & 1 & \frac{1}{2!} & \frac{1}{3!} \end{bmatrix} X \begin{bmatrix} Y_0^{(0)} \\ Y_0^{(1)} \\ Y_0^{(2)} \\ Y_0^{(3)} \\ 4!Y[4] \\ 5!Y[5] \\ 6!Y[6] \\ 7!Y[7] \end{bmatrix}$$

where the second equality follows from substituting Eq. (18); matrices X and $X^{-1}$ are diagonal matrices in powers of h as before and the product $XX^{-1}$ is the identity matrix 1. Satisfying the proceeding for all coefficient values of polynomial $Y_H(t)$ and non-zero h requires $$[1 \quad p_1 \quad p_2 \quad p_3] = [1 \quad q_1 \quad q_2 \quad q_3 \quad q_4] \begin{bmatrix} 1 & 1 & \frac{1}{2!} & \frac{1}{3!} \\ 0 & 1 & 1 & \frac{1}{2!} \\ 0 & 0 & 1 & 1 \\ 0 & 0 & 0 & 1 \\ 0 & 0 & 0 & 0 \end{bmatrix} \quad (22)$$

together with $$0^T = [1 \quad q_1 \quad q_2 \quad q_3 \quad q_4] \begin{bmatrix} \frac{1}{4!} & \frac{1}{5!} & \frac{1}{6!} & \frac{1}{7!} \\ \frac{1}{3!} & \frac{1}{4!} & \frac{1}{5!} & \frac{1}{6!} \\ \frac{1}{2!} & \frac{1}{3!} & \frac{1}{4!} & \frac{1}{5!} \\ 1 & \frac{1}{2!} & \frac{1}{3!} & \frac{1}{4!} \\ 1 & 1 & \frac{1}{2!} & \frac{1}{3!} \end{bmatrix} \quad (23)$$

For general positive integers p and q, column k of the matrix in Eq. (23) matches coefficients of the k-th linear equation expressed by Eq. (20), column k+1 of the matrix in Eq. (22) matches coefficients of the k-th linear equation expressed by Eq. (21), and column 1 of that matrix trivially represents the identity 1≡1. As Eqs. (20) and (21) are known to uniquely determine coefficients of the p, q rational approximant for $e^x$ satisfying that same set of equations guarantees that the Hermite polynomial $Y_H(t)$ satisfies the Obreshkov relation in Eq. (12).

Derivatives $Y_H^{(k)}(t) = k!Y[k]$ of the Hermite polynomial are used by Gad, E., Nakhla, M., Achar, R., 2009, "A-Stable and L-Stable High-Order Integration Methods for Solving Stiff Differential Equations," IEEE Transactions on Computer-Aided Design of Integrated Circuits and Systems, 28(9) pp. 1359-1372 in estimating the local error of a HOP time step, but they differ from the state derivatives $Y_0^{(k)}$ on the range $p+1 \leq k \leq p+q$. Were this not the case, the Hermite polynomial would be a truncated Taylor expansion at $t=0$, and a Taylor-series method would be equivalent to an A-stable HOP method, which is in contradiction with the known finite region of convergence.

2.2 Multi-Integral HOP Procedure

In place of directly solving for state $Y_h$ at the time step end from state $Y_0$ at the start, an alternative procedure solves for integrated state $W_h$ from integrated initial state $W_0$. States Y are p-th derivatives of the integrated states according to $Y_0 = W_0^{(p)}$ and $Y_h = W_h^{(p)}$. Equation (11) still applies to states $Y_0$ and $Y_h$, but the Obreshkov relation from Eq. (12) is now applied to derivatives $W_0^{(k)}$ and $W_h^{(k)}$ in place of $Y_0^{(k)}$ and $Y_h^{(k)}$. The symbol W is also substituted for Y in Eq. (16) for the Hermite polynomial of order p+q and in matching derivatives through $W_0^{(p)}$ along with $W_h^{(q)}$.

The alternative procedure starts each step with $Y_0 = W_0^{(p)}$ as the initial state and would require the determination of $W_0^{(p-1)}, \ldots, W_0^{(0)}$ from $W_0^{(p)}$. These integrations are easily performed in the linear constant-coefficient case by noting that if $\dot{Y}(t) = AY(t)$, then $\dot{W}(t) = AW(t)$ is a differential equation for the integrated state meeting the stated conditions, and the relation $W(t) = A^{-1}\dot{W}(t)$ readily determines the integrations of $W_0^{(p)}$. All constants of integration may be set to zero as the requirement is finding a usable initial state $W_0$ and not necessarily a unique $W_0$.

The proposed $W_0$ and derivatives $W_0^{(k)}$ through k=p therefore satisfy the same ODEs as $Y_0$, having the same coefficient matrix A with the same eigenvectors and eigenvalues; the two cases only differ in their initial values. Setting $W_0$ to the eigenvector with eigenvalue $\lambda_i$, it follows that not only does $W_k = R_{p,q}(\lambda_i h) W_0 \approx e^{\lambda_i h} W_0$ according to the pattern of Eq. (14), but also $$Y_h = W_h^{(p)} = R_{p,q}(\lambda_i h) W_0^{(p)} = R_{p,q}(\lambda_i h) Y_0 \quad (24)$$

according to Eq. (15), provided p<q. The relation $Y_h^{(k)} = R_{p,q}(\lambda_i h) Y_0^{(k)}$ for $1 \leq k \leq p$, however, no longer holds as it did before. As a consequence, derivatives $Y_h^{(k)}$ through order k=p are no longer guaranteed continuous across solution time steps.

It is possible to avoid calculating integrals of the state by considering properties of the differential equation residual of the Hermite polynomial for the integrated state. In the linear case, one may define $$E_W(t) = \dot{W}_H(t) - AW_H(t) \quad (25)$$

along with $E_0^{(k)} = E_W^{(k)}(0)$ and $E_h^{(k)} = E_W^{(k)}(h)$ for sample values of the residual derivatives taken at the start and end of a time step. The relations $E_0^{(k-1)} = 0$ for $1 \leq k \leq p$ and $E_h^{(k-1)} = 0$ for $1 \leq k \leq q$ are necessary and sufficient for the state vector derivatives to satisfy the differential equations according to $W_0^{(k)} = AW_0^{(k-1)}$ and $W_h^{(k)} = AW_h^{(k-1)}$ on their respective ranges of k.

Calculating integrations of $W_0^{(p)}$ can therefore be avoided by setting $E_0^{(k-1)} = 0$ for $1 \leq k \leq p$ without needing to know the underlying values of $W_0^{(p-1)}, \ldots, W_0^{(0)}$. The value of $W_0^{(p)} = p! W_H[p]$ is the initial state $Y_0$ at the start of the time step interval, and polynomial coefficients $W_H[p+k]$ for $1 \leq k \leq q$ are the q free parameters that can be adjusted to satisfy $E_h^{(k-1)} = 0$ for $1 \leq k \leq q$. The complete set of q+I non-zero residual derivatives $E_0^{(k-1)}$ for $p+1 \leq k \leq q+1$ are calculated from initial state $W_0^{(p)} = Y_0$ and free parameters $W[p+k]$ for $1 \leq k \leq q$, supplying a Taylor series having a limited number of terms specifying the complete set of polynomial coefficients to $E_W(t)$. Those polynomial coefficients are used to compute residual derivative values $E_h^{(k-1)}$ for $1 \leq k \leq q$ at the end of the time step.

The same process may also be applied to non-linear ODEs. Equation (11) determines a value for $E_0^{(p)}$ from $Y_0$, and higher residual derivatives Erk) for k>p may be determined through an algorithmic differentiation procedure. A system of linear ODEs has an exact Taylor expansion of limited order whereas the truncated Taylor expansion for non-linear ODEs is only approximate.

2.3 Integral-Derivative State Variable Pairs

Many mechanical and electrical systems have state variables occurring in integral-derivative pairs such as position and velocity in a mechanical system or capacitor voltage and inductor current in a series electrical circuit.

The relationship between a pair of position and velocity generalized coordinates in a multibody dynamical system is linear, even though the overall system may be non-linear owing to gyroscopic forces. This relationship allows the direct determination of Hermite polynomial free parameters for a position variable from the same type of parameters for velocity, reducing by half the number of parameters in the non-linear minimization procedure for differential equation residuals at the end of a solution time step. This simplification is applicable both to the multi-derivative and the multi-integral HOP methods.

For an order p,q HOP procedure, the vector of position state variables has the Hermite polynomial $Y_H(t)$ expressed in Eq. (16) whereas the counterpart vector of velocity state variables has the Hermite polynomial of the same form where V is substituted for Y. The linear constant-coefficient differential equation system $V(t) = \dot{Y}(t)$ leads to the q vector equations $$V_h^{(k-1)} = V_H^{(k-1)}(h) = Y_H^{(k)}(h) = Y_h^{(k)}, \quad 1 \leq k \leq q \quad (26)$$

The vector coefficients Y[k] on the range $p+1 \leq k \leq p+q$ thus may be expressed in terms of the q free parameters V[k], initial states $Y_0$ and $V_0$, and derivatives $V_0^{(k)}$ along with $Y_0^{(k)} = V_0^{(k-1)}$ on the range $1 \leq k \leq p$. A closed-form relationship for Y[k] in terms of these other variables is derived for any given order p,q in what follows, starting by taking derivatives of polynomials of the form of Eq. (16) and substituting into Eq. (26).

From the relations in Eq. (18) and $Y_0^{(k)} = V_0^{(k-1)}$, $$X \begin{bmatrix} Y_h^{(0)} \\ Y_h^{(1)} \\ Y_h^{(2)} \\ Y_h^{(3)} \\ Y_h^{(4)} \end{bmatrix} = \begin{bmatrix} 1 & 1 & \frac{1}{2!} & \frac{1}{3!} & \frac{4!}{4!} & \frac{5!}{5!} & \frac{6!}{6!} & \frac{7!}{7!} \\ 0 & 1 & 1 & \frac{1}{2!} & \frac{4!}{3!} & \frac{5!}{4!} & \frac{6!}{5!} & \frac{7!}{6!} \\ 0 & 0 & 1 & 1 & \frac{4!}{2!} & \frac{5!}{3!} & \frac{6!}{4!} & \frac{7!}{5!} \\ 0 & 0 & 0 & 1 & \frac{4!}{1!} & \frac{5!}{2!} & \frac{6!}{3!} & \frac{7!}{4!} \\ 0 & 0 & 0 & 0 & \frac{4!}{0!} & \frac{5!}{1!} & \frac{6!}{2!} & \frac{7!}{3!} \end{bmatrix} X \begin{bmatrix} Y_0^{(0)} \\ V_0^{(0)} \\ V_0^{(1)} \\ V_0^{(2)} \\ Y[4] \\ Y[5] \\ Y[6] \\ Y[7] \end{bmatrix}, \quad (27)$$

$$X \begin{bmatrix} Y_h^{(0)} \\ Y_h^{(1)} \\ Y_h^{(2)} \\ Y_h^{(3)} \\ Y_h^{(4)} \end{bmatrix} = \begin{bmatrix} 1 & 1 & \frac{1}{2!} & \frac{1}{3!} & \frac{4!}{4!} & \frac{5!}{5!} & \frac{6!}{6!} & \frac{7!}{7!} \\ 0 & 1 & 1 & \frac{1}{2!} & \frac{4!}{3!} & \frac{5!}{4!} & \frac{6!}{5!} & \frac{7!}{6!} \\ 0 & 0 & 1 & 1 & \frac{4!}{2!} & \frac{5!}{3!} & \frac{6!}{4!} & \frac{7!}{5!} \\ 0 & 0 & 0 & 1 & \frac{4!}{1!} & \frac{5!}{2!} & \frac{6!}{3!} & \frac{7!}{4!} \\ 0 & 0 & 0 & 0 & \frac{4!}{0!} & \frac{5!}{1!} & \frac{6!}{2!} & \frac{7!}{3!} \end{bmatrix} X \begin{bmatrix} V_0^{(0)} \\ V_0^{(1)} \\ V_0^{(2)} \\ V_0^{(3)} \\ V[4] \\ V[5] \\ V[6] \\ V[7] \end{bmatrix}$$

Multiplying each matrix X into the vector on its right and equating $Y_h^{(k)} = V_h^{(k-1)}$ for $1 \leq k \leq q$, which keeps the bottom 4 rows of the first-line coefficient matrix, the top 4 rows of the second-line coefficient matrix, $$\begin{bmatrix} 0 & 1 & 1 & \frac{1}{2!} & \frac{4!}{3!} & \frac{5!}{4!} & \frac{6!}{5!} & \frac{7!}{6!} \\ 0 & 0 & 1 & 1 & \frac{4!}{2!} & \frac{5!}{3!} & \frac{6!}{4!} & \frac{7!}{5!} \\ 0 & 0 & 0 & 1 & \frac{4!}{1!} & \frac{5!}{2!} & \frac{6!}{3!} & \frac{7!}{4!} \\ 0 & 0 & 0 & 0 & \frac{4!}{0!} & \frac{5!}{1!} & \frac{6!}{2!} & \frac{7!}{3!} \end{bmatrix} \begin{bmatrix} Y_0^{(0)} h^0 \\ V_0^{(0)} h^1 \\ V_0^{(1)} h^2 \\ V_0^{(2)} h^3 \\ Y[4] h^4 \\ Y[5] h^5 \\ Y[6] h^6 \\ Y[7] h^7 \end{bmatrix} = \tag{28}$$

$$\begin{bmatrix} 1 & 1 & \frac{1}{2!} & \frac{1}{3!} & \frac{4!}{4!} & \frac{5!}{5!} & \frac{6!}{6!} & \frac{7!}{7!} \\ 0 & 1 & 1 & \frac{1}{2!} & \frac{4!}{3!} & \frac{5!}{4!} & \frac{6!}{5!} & \frac{7!}{6!} \\ 0 & 0 & 1 & 1 & \frac{4!}{2!} & \frac{5!}{3!} & \frac{6!}{4!} & \frac{7!}{5!} \\ 0 & 0 & 0 & 1 & \frac{4!}{1!} & \frac{5!}{2!} & \frac{6!}{3!} & \frac{7!}{4!} \end{bmatrix} \begin{bmatrix} V_0^{(0)} h^1 \\ V_0^{(1)} h^2 \\ V_0^{(2)} h^3 \\ V_0^{(3)} h^4 \\ V[4] h^5 \\ V[5] h^6 \\ V[6] h^7 \\ V[7] h^8 \end{bmatrix}$$

Variable $Y_0$ multiplies a zero column whereas $V_0^{(0)}, \ldots, V_0^{(2)}$ multiply the same columns on the left and right sides of Eq. (28), allowing the removal of those variables and leading to $$\begin{bmatrix} \frac{3!}{3!} & \frac{4!}{4!} & \frac{5!}{5!} & \frac{6!}{6!} \\ \frac{3!}{2!} & \frac{4!}{3!} & \frac{5!}{4!} & \frac{6!}{5!} \\ \frac{3!}{1!} & \frac{4!}{2!} & \frac{5!}{3!} & \frac{6!}{4!} \\ \frac{3!}{0!} & \frac{4!}{1!} & \frac{5!}{2!} & \frac{6!}{3!} \end{bmatrix} \begin{bmatrix} 4Y[4]h^4 \\ 5Y[5]h^5 \\ 6Y[6]h^6 \\ 7Y[7]h^7 \end{bmatrix} = \begin{bmatrix} \frac{3!}{3!} & \frac{4!}{4!} & \frac{5!}{5!} & \frac{6!}{6!} & \frac{7!}{7!} \\ \frac{3!}{2!} & \frac{4!}{3!} & \frac{5!}{4!} & \frac{6!}{5!} & \frac{7!}{6!} \\ \frac{3!}{1!} & \frac{4!}{2!} & \frac{5!}{3!} & \frac{6!}{4!} & \frac{7!}{5!} \\ \frac{3!}{0!} & \frac{4!}{1!} & \frac{5!}{2!} & \frac{6!}{3!} & \frac{7!}{4!} \end{bmatrix} \begin{bmatrix} \frac{1}{3!} V_0^{(3)} h^4 \\ V[4] h^5 \\ V[5] h^6 \\ V[6] h^7 \\ V[7] h^8 \end{bmatrix}$$

Identifying identical columns on the left and right-hand sides along with substituting $V_0^{(3)}/3! = V[3]$ gives $$\begin{bmatrix} 1 & 1 & 1 & 1 & 1 \\ 3 & 4 & 5 & 6 & 7 \\ 3 \cdot 2 & 4 \cdot 3 & 5 \cdot 4 & 6 \cdot 5 & 7 \cdot 6 \\ 3 \cdot 2 \cdot 1 & 4 \cdot 3 \cdot 2 & 5 \cdot 4 \cdot 3 & 6 \cdot 5 \cdot 4 & 7 \cdot 6 \cdot 5 \end{bmatrix} \begin{bmatrix} C_0 \\ C_1 \\ C_2 \\ C_3 \\ C_4 \end{bmatrix} = 0, \tag{29}$$

$$G \begin{bmatrix} C_0 \\ C_1 \\ C_2 \\ C_3 \\ C_4 \end{bmatrix} = \begin{bmatrix} 4Y[4]h^4 - V[3]h^4 \\ 5Y[5]h^5 - V[4]h^5 \\ 6Y[6]h^6 - V[5]h^6 \\ 7Y[7]h^7 - V[6]h^7 \\ -V[7]h^8 \end{bmatrix}$$

Inspection of solutions generated by symbolic algebra software suggests that the alternating-sign binomial coefficients $C_0 = 1$, $C_1 = -4$, $C_2 = 6$, $C_3 = -4$, $C_4 = 1$ supply the solution to the preceding homogenous linear form within scale factor G.

Theorem: The integer-power weighted alternating binomial-coefficient sum $$\sum_{k=0}^{q} k^r (-1)^k C_{q,k} = 0, \quad C_{q,k} = \frac{q!}{k!(q-k)!} \tag{30}$$

is valid for integer $0 \le r \le q-1$.

Proof: The binomial coefficients are defined by the relationship $$(1+x)^q = \sum_{k=0}^{q} C_{q,k} x^k \tag{31}$$

having derivative of order r $$q \ldots (q-r+1)(1+x)^{q-r} = \sum_{k=r}^{q} k \ldots (k-r+1) C_{q,k} x^{k-r} \tag{32}$$

$$= \sum_{k=0}^{q} k \ldots (k-r+1) C_{q,k} x^{k-r}$$

$$= \sum_{k=0}^{q} (k^r + P_{r-1}(k)) C_{q,k} x^{k-r}$$

where the change in the lower summation limit from $k=r$ to $k=0$ is allowed because the product $k \ldots (k-r+1)$ has one zero term provided $k<r$. Polynomial $P_{r-1}(k)$ has powers of k up to $k^{r-1}$. Eqs. (31) and (32) are generating functions, which are employed in combinatorial proofs.

Starting with Eq. (30) being valid for $r=0$ when $x=-1$ is substituted into Eq. (31), knowing that the left-hand side of Eq. (32) is also zero when $x=-1$ subject to $r \le q-1$ so as to not annihilate the last factor $(1+x)$, and assuming that Eq. (30) is valid for all smaller integers r to the value under consideration, it follows that the term from Eq. (32)

$$\sum_{k=0}^{q} P_{r-1}(k) C_{q,k} x^k = 0, \quad x = -1$$

proving by induction that $$\sum_{k=0}^{q} k^r C_{q,k} x^k = 0, \quad x = -1, \quad 0 \le r \le q-1 \quad \square$$

The homogenous linear system from Eq. (29) generalizes to the set of equations $$\sum_{k=0}^{q} C_k = 0, \tag{33}$$

$$\sum_{k=0}^{q} (k+p) C_k = 0,$$

-continued $$\sum_{k=0}^{q}(k+p)(k+p-1)C_k = 0,$$

$$\vdots$$

$$\sum_{k=0}^{q}(k+p)\ldots(k+p-q+2)C_k = 0$$

Theorem: The alternating-sign binomial coefficients $C_k = C_{q,k}(-1)^k$ for $0 \le k \le q$ satisfy Eq. (33). Proof: Equation (33) may be represented by the q equations $$\sum_{k=0}^{q} C_k = 0;$$ (34)

$$\sum_{k=0}^{q}(k^r + P_{r-1}(k))C_k, \ 1 \le r \le q-1$$

where r is an integer index. From the prior theorem, $C_k = C_{q,k}(-1)^k$ is a known solution.

Upon substituting binomial coefficients to obtain a solution to Eq. (29), $$G\begin{bmatrix} 1 \\ -4 \\ 6 \\ -4 \\ 1 \end{bmatrix} = \begin{bmatrix} 4Y[4]h^4 - V[3]h^4 \\ 5Y[5]h^5 - V[4]h^5 \\ 6Y[6]h^6 - V[5]h^6 \\ 7Y[7]h^7 - V[6]h^7 \\ -V[7]h^8 \end{bmatrix},$$ (35)

$$G = -V[7]h^8,$$

$$Y[4] = \frac{1}{4}(V[3] - V[7]h^4), \ Y[5] = \frac{1}{5}(V[4] + 4V[7]h^3),$$

$$Y[6] = \frac{1}{6}(V[5] - 6V[7]h^2), \ Y[7] = \frac{1}{7}(V[6] + 4V[7]h)$$

which generalizes to $$Y[k] = \frac{1}{k}(V[k-1] - C_{q,k-p-1}V[p+q](-h)^{p+q+1-k}),$$ (36)

$$p+1 \le k \le p+q$$

The first derivative of the Hermite polynomial has the representation $$\dot{Y}_H(t) = Y[1] + 2Y[2]t + 3Y[3]t^2 + 4Y[4]t^3 + 5Y[5]t^4 +$$ (37)

$$6Y[6]t^5 + 7Y[7]t^6$$

$$= V[0] + V[1]t + V[2]t^2 +$$

$$(V[3] - V[7]h^4)t^3 + (V[4] + 4V[7]h^3)t^4 +$$

$$(V[5] - 6V[7]h^2)t^5 + (V[6] + 4V[7]h)t^6$$

Defining the integrated position W(t) and velocity U(t) according to $W^{(p)}(t) = W^{(3)}(t) = Y(t)$ and $U^{(p)}(t) = U^{(3)}(t) = V(t)$, substituting W for Y, U for V and differentiating Eq. (37) p=3 times gives $$\dot{Y}_H(t) = 3 \cdot 2 \cdot 1(U[3] - U[7]h^4)t^0 + 4 \cdot 3 \cdot 2(U[4] + 4U[7]h^4)t^1 +$$ (38)

$$5 \cdot 4 \cdot 3(U[5] - 6U[7]h^2)t^2 + 6 \cdot 5 \cdot 4(U[6] + 4U[7]h)t^3$$

$$= (V[0] - 3 \cdot 2 \cdot 1 \cdot 1U[7]h^4)t^0 + (V[1] + 4 \cdot 3 \cdot 2 \cdot 4U[7]h^3)t^1 +$$

$$(V[2] - 5 \cdot 4 \cdot 3 \cdot 6U[7]h^2)t^2 + (V[3] + 6 \cdot 5 \cdot 4 \cdot 4U[7]h)t^3,$$

$$V[4] = 7 \cdot 6 \cdot 5 \cdot U[7]$$

or $$\dot{Y}_H(t) = \left(V[0] - \frac{3 \cdot 2 \cdot 1}{7 \cdot 6 \cdot 5}V[4]h^4\right)t^0 + \left(V[1] + \frac{4 \cdot 3 \cdot 2}{7 \cdot 6 \cdot 5}4V[4]h^3\right)t^1 +$$

$$\left(V[2] - \frac{5 \cdot 4 \cdot 3}{7 \cdot 6 \cdot 5}6V[4]h^2\right)t^2 + \left(V[3] + \frac{6 \cdot 5 \cdot 4}{7 \cdot 6 \cdot 5}4V[4]h\right)t^3$$

Generalizing to order p, q and g integrations, $\dot{Y}_H(t)$ on $p-g \le k \le p-g+q-1$ has coefficients $$Y_D[k] = V[k] - \gamma_{k,g}C_{q,k-p+g}V[p-g+q](-h)^{p-g+q-k},$$ (39)

$$\gamma_{k,0} = 1, \ \gamma_{k,1} = \frac{k+1}{p+q}, \ \gamma_{k,g \ge 2} = \frac{(k+g)\ldots(k+1)}{(p+q)\ldots(p+q+1-g)}$$

2.4 Determining Power Series for the Dependent Variables

The proposed embodiment of an order p, q HOP method represents each state variable with an interpolating polynomial, formed according to Eq. (16) from the initial value, together with p derivatives of that state variable, and followed by q free parameters. The free parameters are adjusted to minimize the differential equation residuals. The p-integral HOP method is even simpler. The interpolating polynomial for each state variable is constructed from its initial value followed by q free parameters without any calculated derivatives. That polynomial is the p-th derivative of the Hermite polynomial for the p-th integral of the state variable, cancelling any constants of integration.

Representing position and velocity by two separate Hermite polynomials requires modifying the procedure for calculating the dependent variables given in Milenkovic, P., 2011, "Solution of the Forward Dynamics of a Single-Loop Linkage using Power Series," ASME Journal of Dynamic Systems, Measurement, and Control, 133(6) p. 061002 (11 henceforth "Forward Dynamics") hereby incorporated by reference and the Series Solution reference cited above, where the polynomial coefficients for position result from integrating the polynomials for velocity. Substituting for variables in Eqs. (37)-(39), the position state variable Y(t) becomes joint angle θ(t) having angle derivative $D(t) = \dot{\theta}(t)$ with polynomial coefficients $D[k] = (k+1)\theta[k+1]$. The velocity state variable V(t) becomes joint rate C(t) having its different set of polynomial coefficients C[k].

In the current description, "angle derivative" coefficients D[k] determine Taylor series coefficients at t=0 for all positional kinematic variables, where substituting C[k]=D[k] drives the process described above. This process generates a power series expansion solving a closed-loop kinematics problem, a strictly algebraic relationship although one having a complicated implicit formulation.

The resulting series coefficients for all positional variables allows solving for a separate set of "joint rate" coefficients C[k] determining rigid-body angular velocities and center-of-mass particle velocities followed by joint torques and the torque Jacobian according to the methods described in Appendix I below. The ODE residuals for the multibody dynamics problem are thus the torques of the active joints. See Milenkovic, P., 2013, "Projective Constraint Stabilization for a Power Series Forward Dynamics Solver," ASME Journal of Dynamic Systems, Measurement, and Control, 135(3), p. 031004 hereby incorporated by reference (19 henceforth "Projective Constraint") regarding avoiding kinematic singularities in selecting those joints.

The O(N) Taylor model about t=0 serves to approximate each such joint torque along with q−1 torque derivatives at t=h for the end of the time step. A g-integral HOP method requires calculating up to g integrations of torque at t=h; the integration constants for joint torques are all zero as they are ODE residuals having the properties described in Section 2.2.

Taylor series coefficients at t=0 are calculated for the passive joints, which are kinematically determined by the active joints supplying the state variables, and the angles and rates for the passive joints are corrected for constraint violation at the end of each time step using the projection procedure of the above cited reference. For a given O(N) for the power series of the dependent variables, that step correction was shown equivalent to the change resulting from extending those power series from N+1 to infinite order and hence does not change the coefficients for joint torques taken to O(N).

3 Numerical Procedure

Scaling derivatives or equivalently power series coefficients of the residual is observed in numerical tests to account for significant improvement. Expressing the g-th integral of torque $\tau_i(t)$ (negative superscript denotes integral, positive denotes derivative) for joint i with the Taylor series at t=h $$\tau_i^{(-g)}(t) = \sum_{k=0}^{q-1} h^k \tau_i^{(k-g)}(h) \frac{1}{k!}(t/h-1)^k, \tag{40}$$

$$h^{-g} g! \tau_i^{(-g)}(t) = \sum_{k=0}^{q-1} h^{k-g} \tau_i^{(k-g)}(h) \frac{g!}{k!}(t/h-1)^k$$

leads to the scaled coefficients $$h^{k-g} \tau_i^{(k-g)}(h) \frac{g!}{k!} \tag{41}$$

for 0≤k≤q−1, which also gives the g-th coefficient as simply $\tau_i(h)$, and where g=0 for a multi-derivative method, g=p for a multi-integral method. The contribution of each coefficient is hence about equal on 0≤t≤h.

The Newton-Raphson type minimization procedure requires factoring the Jacobian matrix, which may be performed by the LU method (lower-upper triangular factorization—this algorithm is publically available in the LAPACK function dgetrf( )), to solve the linear system of the form $$J\Delta Y + E = 0 \tag{42}$$

where J is the Jacobian, E the residual vector, and ΔY the vector of coefficient updates.

Derivatives of the state variables at the start of a time step may be determined by an inverse procedure where the state variable derivatives, or parameters generating those derivatives, are varied to minimize residuals in the form of joint torque coefficients at the start of the time step. This procedure benefits from the scaling of Eq. (41) as does the procedure to vary the free parameters to minimize residuals at the time step endpoint. Those derivatives may also be determined by a forward procedure upon solving the forward dynamics problem using the order-recursive algorithm of the Forward Dynamics reference cited above. The proposed scaling is not applicable to the forward procedure. Furthermore, Gad, et al. cited above infer that errors made at one recursive stage propagate to higher orders.

Owing to the importance of scaling in controlling the effects of floating point approximation, the inverse procedure where terms of the state variable polynomials are determined by minimizing joint torques is preferred.

The multi-derivative method requires p derivatives of each state variable at t=0 for its Hermite polynomial. Those derivatives are computed by the forward or inverse procedure only at the start of the initial time step. For subsequent time steps, Eq. (18) determines state derivative values at the end of each time step that are supplied to the start of the next time step, a process that also benefits from torque scaling.

It will be understood that the invention described herein may also be applied to the control of objects whose motion can be decomposed into specific axes but where one or more of the links may represent conceptual rather than actual structure, for example, in the control of spacecraft with respect to the Earth where there is no physical link to the Earth.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

The terms "multiple derivative orders", "multiple integral orders", and the like may include the $0^{th}$ orders as may be understood from context.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

APPENDIX I

Multibody Dynamic System Algorithmic Differentiation Procedure

State Variables of a Multibody Dynamical System. A multibody dynamical system in the form of a linkage is comprised of rigid-body links connected by lower-pair joints. The state vector of that system is comprised of pairs of active-joint angles and rates according to $$Y=(\{\theta_i, C_i\} | i \in \{i_a\})$$

where $\{\theta_i, C_i\}$ denote the set of pairings of the angle and rate for joints designated by index i and $i \in \{i_a\}$ selects the active joints. The state of that system is the function of time $Y=Y(t)$, where $Y_H(t) \approx Y(t)$ denotes a polynomial for a numerical approximation to the differential equation (dynamic system) solution having coefficients formed from zero or more derivatives of the state at starting point of a time step along with free parameters. Each joint rate $C_i = C_i(t)$ for the active joints $i \in \{i_a\}$ is hence expressed with a scalar polynomial included in the vector $Y_H(t)$.

These active joints are selected to be any convenient subset of the joints in the linkage from which the positions and rates of the remaining joints, the so-called passive joints, along with the locations of all of the links, may be determined using the method of the US patent application 2012/0303318 entitled "Kinematic Predictor For Articulated Mechanisms" and exemplified by Milenkovic, P., 2012, "Series Solution for Finite Displacement of Single-Loop Spatial Linkages," ASME Journal of Mechanisms and Robotics, 4(2) p. 021016. When all of the power series coefficients $C_i[k]$ for the active joints $i \in \{i_a\}$ are completely specified by the parameters comprising polynomial $Y_H(t)$, the unique solution to the linear system of equations $$AC[k]+B[k]=0$$

determines the power series coefficients for the passive joints $C_i[k]$. Constant matrix A is determined from the linkage geometry at the start of the time step and each "right-hand side" term B[k] is calculated in the order-recursive process from the joint rate coefficient vectors C[0], . . . , C[k−1].

Differential Equation Residual of the Dynamic System. According to Milenkovic, P., 2011, "Solution of the Forward Dynamics of a Single-Loop Linkage using Power Series," ASME Journal of Dynamic Systems, Measurement, and Control, 133(6) p. 061002, a publication also referenced in US patent application 2012/0303318, a linkage subject to inertial and other forces augments the preceding kinematic equation on the power series coefficients for index k≥1 to form the dynamic equation $$\begin{bmatrix} A^T & M \\ 0 & A \end{bmatrix} \begin{bmatrix} C_G[k-1] \\ C[k] \end{bmatrix} + \begin{bmatrix} B_G[k-1] \\ B[k] \end{bmatrix} = 0$$

Link inertias and the link locations at the time step starting point determine the constant "mass matrix" M, A is the same matrix from the kinematic equation, and the two right-hand side terms $B_G[k-1]$ and B[k] are calculated in order-recursive fashion from solutions for prior values of k. The power series coefficients for the "wrench" are $W_G[k-1]=kC_G[k-1]$, this wrench denoting a pairing of a force and a moment vector at a ground connection of a single-loop linkage or at a "cut point" in a multi-loop linkage.

The "forward dynamics" problem is one in which the pure kinematic relation AC[k]+B[k]=0 does not have a unique solution but the dynamic equation provides a unique solution for both $C_G[k-1]$ and C[k]. Specifying initial values $C_i[0]=C_i(0)$ for the active joints $i \in \{i_a\}$ provides for a unique solution to AC[k]+B[k]=0 for k=0. When the parameters governing the active joint coefficients are fully determined by the candidate differential equation solution $Y_H(t)$, however, the kinematic relation alone has a unique solution for joint rate coefficients $C_i[k]$ making up vector C[k], but the linear system comprising the dynamic equation can still be solved for wrench coefficients $W_G[k-1]=kC_G[k-1]$. Such a process solves the "inverse dynamics" problem of finding joint torques when all of the linkage motions are specified, which is indeed the case when the differential equation solution is expressed with the polynomial $Y_H(t)$.

The joint rate coefficients C[k] in turn determine the motion trajectories of the links. Those motion trajectories acting on the link inertias, the joint rates themselves acting on springs and dampers or other sources of force or torque applied to the joints, together with the wrench coefficients $W_G[k-1]$ determine the power series coefficients $\tau_{Ai}[k-1]$ for the applied torques on each of the joints in the linkage according to the formulas in the preceding references.

Where the applied torques $\tau_{Ai}(t)$ on the active joints are defined to be "everything but" the torques accounted for by link inertia, joint springs and dampers, gravity, motor torques, or any other forces acting on or applied to the linkage, the dynamical-system differential equation may be expressed by the simple relationship $\tau_{Ai}(t)=0$ for the active joints $i \in \{i_a\}$. Hence the differential equation has the vector residual function or "residuals"

$$E(t)=\{\tau_{Ai}(t)\}, i \in \{i_a\}$$

having the power series (Taylor series) expansion $E(t)=E[0]+E[1]t+ \ldots +E[k-1]t^{k-1}+ \ldots$ . The values of the coefficients $E[k-1]$ are hence determined to any index k given the finite collection of coefficients of the state-vector polynomial $Y_H(t)$. Such is done by the above referenced procedure in the example of a linkage multibody dynamic system.

Solving for the Residual Coefficients from the Free Parameters by Algorithmic Differentiation. Either derivatives (as in the Multi-Derivative Method) or integrals (as in the Multi-Integral Method) of the residual vector E(t) at the time-step endpoint are readily determined from the aforementioned power series coefficients. Directing those derivatives or integrals to zero requires determining the sensitivity of each Taylor series coefficient E[k] starting at E[0] to variation in the free parameters of polynomial $Y_H(t)$. Once those sensitivities are known, the Jacobian matrix relating the sensitivity of q differentiated or integrated endpoint residual vectors to variation in q vector values for the polynomial free parameters is readily determined, and free parameters minimizing the required residual quantities are obtained by well-known Newton-Raphson type minimization algorithms.

The sensitivity coefficients of the Taylor series of the residuals are determined by an Algorithmic Differentiation procedure for computing multi-variate partial derivatives. The particular implementation of such a procedure used in the multibody system dynamics example expands each polynomial coefficient Y[k], or Taylor series coefficient E[k−1] derived from the polynomial coefficients, according to the form $$Y[k]=Y[0,k]+\grave{o}Y[1,k], E[k-1]=E[0,k-1]+\grave{o}E[1,k-1]$$

Determining the Jacobian matrix requires repeating this process q times for each vector element of Y on the range of q values of Y[k] constituting the free parameters. In each repetition, all vector elements of Y[1,k] for the q values of k are set to zero apart from a single element that is set to unity. The resulting collection of terms E[1,k−1] generated with each repetition allow computing the required Jacobian matrix used in determining the free parameters by an iterative optimization process.

The quantities E[k−1]=E[0,k−1] are the original E[k−1] values computed according to the single-variate Algorithm Differentiation procedure in Milenkovic (2011). Coefficients of the form E[1,k−1] are determined by these simple rules.

Consider scalar ò parameterizing polynomial coefficient variation in the manner that parameterizes time variation. For quantities a(ò), b(ò), and their product c(ò)=a(ò)b(ò) expressed in truncated Taylor series $$c[0] + \grave{o}c[1] = (a[0] + \grave{o}a[1])(b[0] + \grave{o}b[1])$$
$$= a[0]b[0] + \grave{o}(a[1]b[0] + a[0]b[1]) + O(\grave{o}^2)$$

equating powers of ò and allowing that the term $O(\grave{o}^2)$ vanishes in relative importance as $\grave{o} \rightarrow 0$, $$i\ c[0]=a[0]b[0],$$

$$c[1]=a[1]b[0]+a[0]b[1]$$

where the second line embodies the product law of differentiation. Trivially, the sum c(ò)=a(ò)+b(ò) reduces to c[0]=a[0]+b[0] and c[1]=a[1]+b[1]. Contrast this with the finite-difference calculation $$c[1] = \frac{(a[0] + ha[1])(b[0] + hb[1]) - a[0]b[0]}{h}$$
$$= a[1]b[0] + a[0]b[1] + ha[1]b[1]$$

that only approaches the exact value in the limit as $h \rightarrow 0$. Furthermore, the top line becomes sensitive to floating point round off for small h.

Solving first for E[k−1]=E[0,k−1] by the procedures disclosed in US 2012/0303318, Milenkovic (2012) and Milenkovic (2011) and applying the above multiplication and addition rules to those same procedures generates the kinematic equation $$AC[1,k]+B[1,k]=0$$

where right-hand side B[1,k] now depends on prior solutions C[0,0], . . . , C[0,k−1], C[0,k] computed in the determination of E[k−1]=E[0,k−1] along with C[1,0], . . . , C[1,k−1]. The dynamic equation $$\begin{bmatrix} A^T & M \\ 0 & A \end{bmatrix} \begin{bmatrix} C_G[1, k-1] \\ C[1,k] \end{bmatrix} + \begin{bmatrix} B_G[1, k-1] \\ B[1,k] \end{bmatrix} = 0,$$

$$k \geq 1$$

is also solvable in order-recursive fashion after first solving the wrench coefficients through $C_G[0,k-1]$ and joint-rate coefficients C[0,k].

Model-Predictive Control.

A type of controller for a walking machine, robot, or other dynamical system employs a differential-equation model of that system inside a computer equipped with sensors to determine the initial state of the system together with actuators to direct the system to a desired state at the end of a time step. Applying control parameters to the model directs that representation of the system along a trajectory towards that goal, and those parameters are adjusted to minimize the deviation from that goal along with cost functions applied to the trajectory. The actual system is then driven with those control parameters, the state of that system at the end of the time step is measured with the sensors, and any departure of the actual state from the desired state is taken into account in formulating the goal for the next time step according to a feedback process updated with each time step.

The control parameters can take the form of power series coefficients for actuated displacements of a subset of the active joints or actuator-applied forces to selected joints. The preceding Algorithmic Differentiation process determines of the sensitivities of link trajectories, or other variables expressed in power series, to variation in the control parameters. The combined set of control parameters and polynomial free parameters may be adjusted to jointly minimize the residual derivative or integral quantities together with the deviation from the desired trajectory.

What I claim is:

1. A dynamic predictor system for an articulated linkage providing a system of links connected by joints comprising:
   an electronic computer executing a stored program held in non-transitory media to:
   (1) store a system of differential equations describing a rate of change of joint state in each joint as a function of other joint states, the joint states describing positions of the joint, spring forces acting on the joint and momentum in connecting links;
   (2) receive a first joint state;
   (3) approximate a second later joint state using a collection of multi-term polynomials corresponding to the differential equations, the polynomials having at least one first term matching the first joint state and multiple later terms related to derivatives of a predicted joint trajectory from the first joint state evaluated at the second joint state;
   (4) evaluate the multiple polynomial terms by minimizing residuals between corresponding differential equations and multi-term polynomials by performing a series expansion of the residuals; and
   (5) use the evaluated multi-term polynomials to output a prediction of the second joint state;
   further including a set of actuators for movement of the joints; and
   wherein the electronic computer further executes the step of receiving a command indicating a desired second joint state and providing feedforward to the actuators based on the predited second joint state.

2. The dynamic predictor of claim 1 wherein the multi-term polynomials are Hermite polynomials.

3. The dynamic predictor of claim 1 including multiple first terms related to multiple derivatives of the first joint state.

4. The dynamic predictor of claim 1 wherein at least one first term is only the first joint state.

5. The dynamic predictor of claim 1 wherein step (4) minimizes multiple derivative orders of the residuals.

6. The dynamic predictor of claim 5 wherein the series expansion is a Taylor series expansion.

7. The dynamic predictor of claim 6 wherein the Taylor series expansion is minimized by algorithmic differentiation.

8. The dynamic predictor of claim 7 wherein the algorithmic differentiation determines a Jacobian matrix.

9. The dynamic predictor of claim 1 further including a set of sensors for monitoring joint positions.

10. A method of controlling an articulated linkage providing a system of links connected by joints, the method comprising:

executing in an electronic computer a stored program held in non-transitory media to
(1) store a system of differential equations describing a rate of change of joint state in each joint as a function of other joint states, the joint states describing positions of the joint, spring forces acting on the joint and joint momentum;
(2) receive a first joint state;
(3) approximate a second later joined state using a system of multi-tem polynomials corresponding to the differential equations, the polynomials having first terms matching the first joint state and multiple later terms related to derivatives of a predicted joint trajectory from the first joint state evaluated at the second joint state;
(4) evaluate the multiple later terms by minimizing residuals between the corresponding differential equations and multi-term polynomials by performing a series expansion of the residuals; and
(5) use the evaluated multi-term polynomials to output a prediction of the second joint state:, further including a set of actuators for movement of the joints; and further including the step of receiving a command indicating a desired second joint state and providing feedforward to the actuators based on the predicted second joint state; and moving the joints based on the provided feedforward.

11. The method of claim 10 wherein the multi-term polynomials are Hermite polynomials.

12. The method of claim 10 wherein step (4) minimizes multiple derivative orders of the residuals.

13. The method of claim 10 wherein the series expansion is a Taylor series expansion.

14. The method of claim 13 wherein the Taylor series expansion is minimized by algorithmic differentiation.

15. The method of claim 14 wherein the algorithmic differentiation determines a Jacobian matrix.

16. The method of claim 10 further including a set of sensors for monitoring joint positions.

* * * * *